(12) United States Patent
Nogawa et al.

(10) Patent No.: US 8,479,705 B2
(45) Date of Patent: Jul. 9, 2013

(54) INTERNAL COMBUSTION ENGINE

(75) Inventors: Shinichiro Nogawa, Mishima (JP); Hisao Suzuki, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 533 days.

(21) Appl. No.: 12/864,628

(22) PCT Filed: Jan. 23, 2009

(86) PCT No.: PCT/IB2009/000112
§ 371 (c)(1),
(2), (4) Date: Jul. 26, 2010

(87) PCT Pub. No.: WO2009/093130
PCT Pub. Date: Jul. 30, 2009

(65) Prior Publication Data
US 2010/0313846 A1    Dec. 16, 2010

(30) Foreign Application Priority Data

Jan. 25, 2008 (JP) ................. 2008-015123

(51) Int. Cl.
*F02D 41/30* (2006.01)
*F02D 41/40* (2006.01)
(52) U.S. Cl.
USPC .......................... 123/299; 123/295
(58) Field of Classification Search
USPC ............. 123/295, 299, 300, 305, 478, 480, 123/492, 493; 701/104, 105
See application file for complete search history.

(56) References Cited

U.S. PATENT DOCUMENTS

| | | | |
|---|---|---|---|
| 5,626,115 A * | 5/1997 | Kawaguchi | 123/305 |
| 6,085,718 A | 7/2000 | Nishimura et al. | |
| 6,125,816 A * | 10/2000 | Inoue | 123/299 |
| 6,637,403 B2 * | 10/2003 | Walter et al. | 123/299 |
| 6,651,677 B2 * | 11/2003 | Sukegawa et al. | 123/305 |
| 6,668,789 B1 * | 12/2003 | Marriott et al. | 123/299 |
| 6,983,732 B2 * | 1/2006 | Kuo et al. | 123/299 |
| 7,370,628 B2 * | 5/2008 | Eves et al. | 123/299 |
| 2006/0118079 A1 | 6/2006 | Shiraishi et al. | |

FOREIGN PATENT DOCUMENTS

| | | |
|---|---|---|
| AT | 006 104 | 4/2003 |
| CN | 1982682 A | 6/2007 |
| DE | 10 2005 059 5 | 6/2007 |
| EP | 1 362 996 A1 | 11/2003 |
| EP | 1 728 998 | 12/2006 |

(Continued)

OTHER PUBLICATIONS

Office Action issued Oct. 9, 2012 in Chinese Patent Application No. 200980102967.8 (partial English translation only).

*Primary Examiner* — Willis R Wolfe, Jr.
(74) *Attorney, Agent, or Firm* — Oblon, Spivak, McClelland, Maier & Neustadt, L.L.P.

(57) ABSTRACT

In an internal combustion engine, on a cylinder head side, a tumble flow is formed that is directed from an intake vent opened on the cylinder head to an exhaust vent opened on the cylinder head. A direct injection valve injects fuel directly into a combustion space. The direct injection valve injects the fuel toward a section where a piston top surface intersects with a cylinder inner surface, at a point closer to an intake top dead center than a middle between the intake top dead center and an intake bottom dead center, and thereafter injects the fuel into the combustion space again.

14 Claims, 15 Drawing Sheets

FOREIGN PATENT DOCUMENTS

| | | |
|---|---|---|
| JP | 10 159619 | 6/1998 |
| JP | 11 159382 | 6/1999 |
| JP | 11 218048 | 8/1999 |
| JP | 2001 271688 | 10/2001 |
| JP | 2002 161790 | 6/2002 |
| JP | 2003 27945 | 1/2003 |
| JP | 2004 92488 | 3/2004 |
| JP | 2005 133660 | 5/2005 |
| JP | 2006 274945 | 10/2006 |
| JP | 2007 64171 | 3/2007 |
| JP | 2007 327464 | 12/2007 |

* cited by examiner

INTERNAL COMBUSTION ENGINE

BACKGROUND OF THE INVENTION

1. Field of the Invention

This invention relates to an internal combustion engine that has a fuel injection valve for directly injecting fuel into a combustion space.

2. Description of the Related Art

In a spark-ignition internal combustion engine of recent years, a so-called direct-injection internal combustion engine for directly injecting fuel into a combustion space to create an air-fuel mixture with air contributing to the combustion has been put to practical use. The direct-injection internal combustion engine is also operable by so-called homogeneous combustion where the fuel and air are homogeneously mixed inside the combustion space to combust the fuel by injecting the fuel into the combustion space during an intake stroke. In the homogeneous combustion operation, it is important to diffuse the fuel and air homogeneously to mix the fuel and air as homogeneously as possible in order to attain good combustion.

Japanese Patent Application Publication No. 10-159619 (JP-A-10-159619) (paragraphs [0005] to [0008]) discloses a technology for obtaining a homogenous air-fuel mixture by injecting fuel into a combustion space at the first half and the second half of an intake stroke. Also, there has been put to practical use an internal combustion engine that has a direct injection valve for directly injecting fuel into a combustion space and a port injection valve for injecting fuel into an intake port, in which the port injection valve is used for homogeneously mixing the fuel and air at the time of homogeneous combustion.

However, such an internal combustion engine having a direct injection valve and port injection valve is complex in structure leading to an increase in production cost. Moreover, the technology disclosed in JP-A-10-159619 does not take, into consideration the flow of air flowing into the combustion space.

SUMMARY OF THE INVENTION

This invention spatially and homogeneously improves mixing of fuel and air by using only a fuel injection device injecting fuel directly into a combustion space in an internal combustion engine that directly injects the fuel into the combustion space.

A first aspect of this invention relates to an internal combustion engine. In this internal combustion engine, a tumble flow that is directed from an intake vent opened on a cylinder head provided at one end of a cylinder having a piston reciprocating therein, to an exhaust vent opened on the cylinder head is formed on the cylinder head side. This internal combustion engine has a combustion space surrounded by the cylinder, the cylinder head, and the piston reciprocating within the cylinder, and a fuel injection device that performs early fuel injection for injecting fuel toward an inner surface of the cylinder between a top surface of the piston and the cylinder head, at a point closer to an intake top dead center than a middle between the intake top dead center and an intake bottom dead center, and late fuel injection for injecting the fuel into the combustion space at a point closer to the intake bottom dead center than the point in the early fuel injection.

During the early fuel injection, the fuel injection device may inject the fuel toward a section where the top surface of the piston intersects with the inner surface of the cylinder.

The fuel injection device may perform the late fuel injection after an air-fuel mixture formed in the combustion space by the early fuel injection is moved to the intake vent side by a tumble flow that is generated in the form of a fluid introduced from the intake vent into the combustion space.

The fuel injection device may inject the fuel during the early fuel injection such as to allow a spray of fuel injected by the fuel injection device to follow the tumble flow of the fluid flowing from the intake vent into the combustion space.

The fuel injection device may inject the fuel such that the spray of fuel injected by the fuel injection device reaches the inner surface of the cylinder first before reaching the top surface of the piston.

The fuel injection device may inject the fuel when an axis line of the spray of fuel injected by the fuel injection device overlaps with the section where the top surface of the piston intersects with the inner surface of the cylinder.

The fuel injection device may inject the fuel into the combustion space by means of the early fuel injection and the late fuel injection, when an engine speed of the internal combustion engine is a predetermined engine speed or lower and a load factor of the internal combustion engine is at least a predetermined load factor.

The fuel injection device may inject the fuel into the combustion space by means of the early fuel injection and the late fuel injection, when the predetermined engine speed is equal to or lower than an engine speed at which a torque fluctuation of the internal combustion engine falls within an allowable range.

The fuel injection device injects the fuel into the combustion space by means of the early fuel injection and the late fuel injection, when the amount of fuel injected into the internal combustion engine is at least a minimum amount of fuel injected by the fuel injection device.

The fuel injection device may inject the fuel a plurality of times during at least either the early fuel injection or the late fuel injection.

The fuel injection device may inject the fuel in a greater amount in the early fuel injection than the amount of fuel injected in the late fuel injection.

The fuel injection device may be provided on the intake vent side.

The fuel injection device may be provided in a central section of the cylinder head.

A second aspect of this invention relates to a fuel injection control method for the internal combustion engine. In this internal combustion engine, a tumble flow that is directed from an intake vent opened on a cylinder head provided at one end of a cylinder having a piston reciprocating therein, to an exhaust vent opened on the cylinder head is formed on the cylinder head side. This fuel injection control method for the internal combustion engine has the steps of performing early fuel injection for injecting fuel toward an inner surface of the cylinder between a top surface of the piston and the cylinder head, at a point closer to an intake top dead center than a middle between the intake top dead center and an intake bottom dead center, and performing late fuel injection for injecting the fuel into a combustion space surrounded by the cylinder, the cylinder head, and the piston reciprocating within the cylinder, at a point closer to the intake bottom dead center than the point in the early fuel injection.

The internal combustion engine and the fuel injection control method for the internal combustion engine described above spatially and homogeneously improve mixing of fuel and air by using only the fuel injection device injecting fuel directly into the combustion space.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, the invention is described in detail with reference to the drawings. Note that the invention is not limited by the best mode for carrying out the invention (to be referred to as "embodiment" hereinafter). In addition, the constituent elements described in the following embodiment include the ones that can readily be envisioned by those skilled in the art, and substantially the same or equivalent ones.

This embodiment, in a spark-ignition internal combustion engine with a fuel injection device for injecting fuel directly into a combustion space surrounded by a piston, cylinder, and a cylinder head, is characterized in carrying out early fuel injection for injecting fuel toward an inner surface of the cylinder between a top surface of the piston and the cylinder head (more specifically a section where the top surface of the piston intersects with the inner surface of the cylinder), at a point closer to an intake top dead center than a middle between the intake top dead center of the piston and an intake bottom dead center of the piston, and late fuel injection for injecting the fuel into the combustion space at a point closer to the intake bottom dead center than the point in the early fuel injection.

Here, the homogeneity of the mixture of the fuel and air is a measure for indicating the proportion of the fuel to the air in the combustion space. The higher the homogeneity of the air-fuel mixture is, the lower the proportion of the fuel to the air. In other words, the homogeneity of the air-fuel mixture is a measure for indicating how homogeneously the fuel of the air-fuel mixture is distributed. In addition, fuel injection control is a control for changing a fuel injection timing for injecting the fuel to the internal combustion engine, the amount of fuel to be supplied to the internal combustion engine, and other parameters related to fuel injection for the internal combustion engine.

Figure 1:
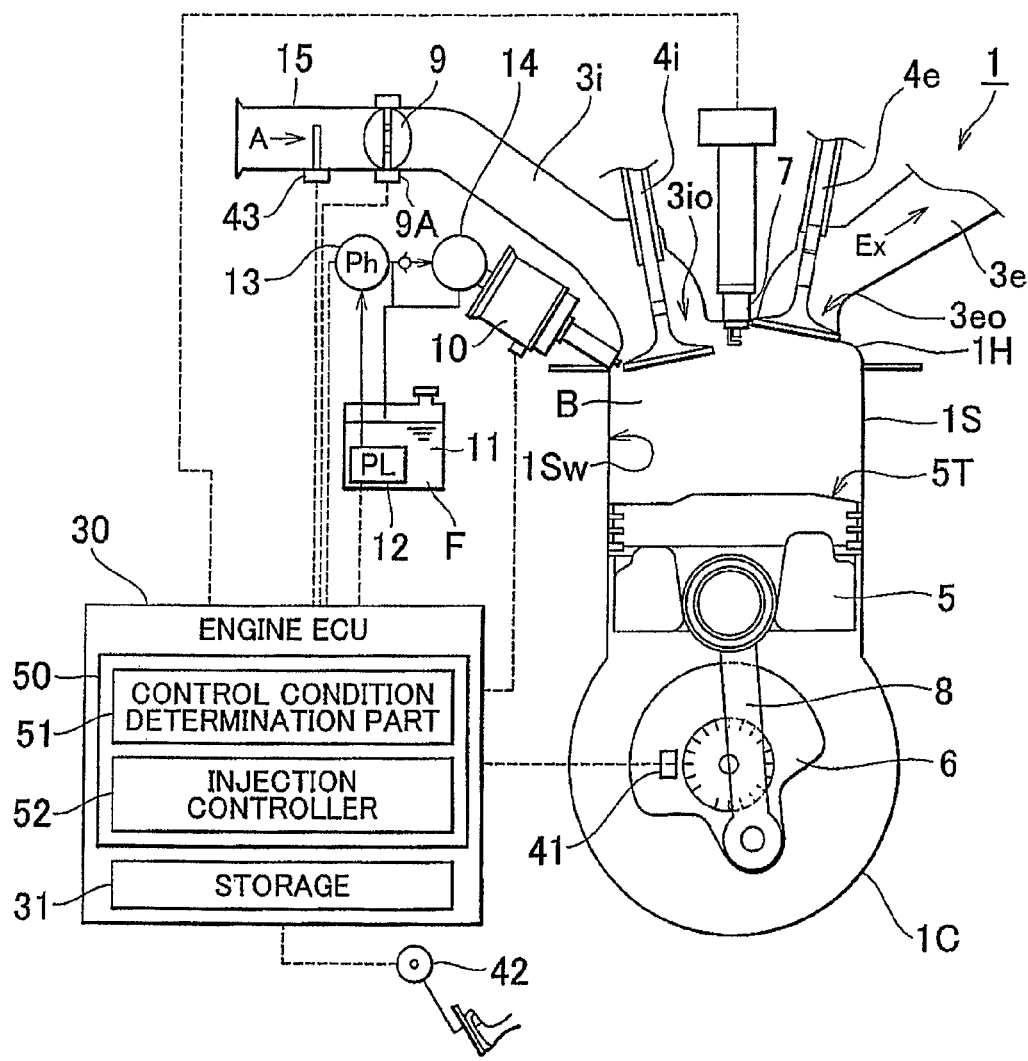
FIG. 1 is a schematic diagram showing the structure of an internal combustion engine according to an embodiment of the invention.

FIG. 1 is a schematic diagram showing the structure of an internal combustion engine according to this embodiment of the invention. A cylinder 1S configuring the internal combustion engine 1 is has a cylindrical structure with a piston 5 disposed therein. One end of the cylinder 1S is provided with a cylinder head 1H, and the other end connected to a crankcase 1C. A piston 5 reciprocates within the cylinder 1S, that is, a space surrounded by the cylinder head 1H and the cylinder 1S. The piston 5 and a crankshaft 6 are coupled to each other by a connecting rod 8. The reciprocating motion of the piston 5 is transmitted to the crankshaft 6 via the connecting rod 8 and then converted to rotary motion.

The space surrounded by the cylinder 1S, cylinder head 1H and piston 5 is a space where a mixture of fuel F and air A contributing to the combustion of the fuel F is combusted. This space is called "combustion space B." An intake port 3*i* and exhaust port 3*e* are connected to the combustion space B. The intake port 3*i* constitutes a part of an intake passage that introduces the air A into the combustion space B. The exhaust port 3*e* constitutes a part of an exhaust gas passage that discharges exhaust gas Ex of the air-fuel mixture combusted in the combustion space B to the outside of the combustion space B.

An intake air introduction passage 15 for introducing the air A to the intake port 3*i* is connected to the intake port 3*i*. The intake air introduction passage 15 is provided with a throttle valve 9 for changing the cross-sectional area of the intake air introduction passage 15. The amount of air A to be introduced into the combustion space B is adjusted by changing the cross-sectional area of the intake air introduction passage 15 using the throttle valve 9. Here, the opening of the throttle valve 9 is adjusted by a throttle actuator 9A. An airflow meter 43 for measuring the amount of air A flowing into the intake air introduction passage 15 (the amount per unit time) is provided on the upper stream side than the throttle valve 9 of the intake air introduction passage 15 (on the flow direction upstream side of the air A, i.e., the intake side of the intake air introduction passage 15). The airflow meter 43 obtains the amount of air A to be introduced into the combustion space B.

The intake port 3*i* and exhaust port 3*e* are opened on the cylinder head 1H. An opening part of the intake port 3*i* constitutes an intake vent 3*io*, and an opening part of the exhaust port 3*e* an exhaust vent 3*eo*. In the intake vent 3*io*, there is disposed an intake valve 4*i* for opening and closing the intake vent 3*io* at a predetermined timing. In addition, in the exhaust vent 3*eo*, there is disposed an exhaust valve 4*e* for opening and closing the exhaust vent 3*eo* at a predetermined timing. The intake valve 4*i* and exhaust valve 4*e* are driven by the power of the crankshaft 6.

A direct injection valve 10 serving as the fuel injection device for injecting the fuel F directly into the combustion space B is mounted on the cylinder head 1H. The fuel F is a hydrocarbon fuel, and gasoline is used in this embodiment. The fuel F is supplied from a fuel distribution pipe 14 to the direct injection valve 10. The fuel distribution pipe 14 is supplied with the fuel F within a fuel tank 11. The fuel F within the fuel tank 11 is fed to a high-pressure pump (Ph) 13 by a low-pressure pump (PL) 12, whereby the fuel F is pressurized and then supplied to the fuel distribution pipe 14. Controlling the high-pressure pump 13 can change the pressure of the fuel F (fuel pressure) within the fuel distribution pipe 14.

The internal combustion engine 1 shown in FIG. 1 has a plurality of cylinders 1S and pistons 5. In this case, the directly injection valve 10 is provided in the combustion space B of each cylinder 1S. Each of the direct injection valves 10 is mounted on the fuel distribution pipe 14, and the fuel F is supplied from the fuel distribution pipe 14 to each direct injection valve 10. Note in this embodiment that the number of the cylinders 1S and pistons 5 or how they are arranged in the internal combustion engine 1 is not particularly limited.

Each direct injection valve 10 injects the fuel F to the air A that is introduced from the intake vent 3*io* into the combustion space B via the intake port 3*i*, and the forms a mixture of the fuel F and air A. The cylinder head 1H is mounted with a spark plug 7 serving as ignition means. As the spark plug 7 discharges electricity, the air-fuel mixture within the combustion space B is ignited. The pressure of the combustion gas generated by the combustion of the air-fuel mixture reciprocates the piston 5 within the cylinder 1S. The combustion gas becomes the exhaust gas Ex after driving the piston 5 and is discharged to the exhaust port 3*e* via the exhaust vent 3*eo*. As described above, the internal combustion engine 1 is a spark-ignition type reciprocating internal combustion engine.

The internal combustion engine 1 is controlled by an engine electronic control unit (ECU) 30. Therefore, the engine ECU 30 acquires detection values from a crank angle sensor 41 for measuring a rotation angle of the crankshaft of the internal combustion engine 1, an accelerator opening sensor 42 for detecting accelerator opening, and the airflow meter 43, and controls control targets based on these detection values to control the internal combustion engine 1. Here, the control targets of the engine ECU 30 include the spark plug 7, direct injection valve 10, low-pressure pump 12, high-pressure pump 13, and throttle actuator 9A.

The engine ECU 30 has a processor 50, various maps having the descriptions of the fuel injection amount and fuel injection timing and used for controlling the operation of the internal combustion engine 1, and a storage 31 for storing a control computer program and, the like of the internal combustion engine 1. The processor 50 is configured by, for example, a central processing unit (CPU) and memory. The storage 31 is configured by, for example, a nonvolatile memory such as a flash memory, a memory capable of reading data, such as a read only memory (ROM), a memory capable of reading and writing data, such as a random access memory (RAM), or a combination of these memories.

The processor 50 has a control condition determination part 51 and injection controller 52. Therefore, the processor 50 executes fuel injection control for the internal combustion engine according to the embodiment. When the processor 50 has a mechanism capable of controlling the ignition timing for the internal combustion engine 1 and changing the timing at which the internal combustion engine 1 can open/close or lift the intake valve 4*i* and exhaust valve 4*e*, the processor 50 controls this mechanism.

Figure 2A:
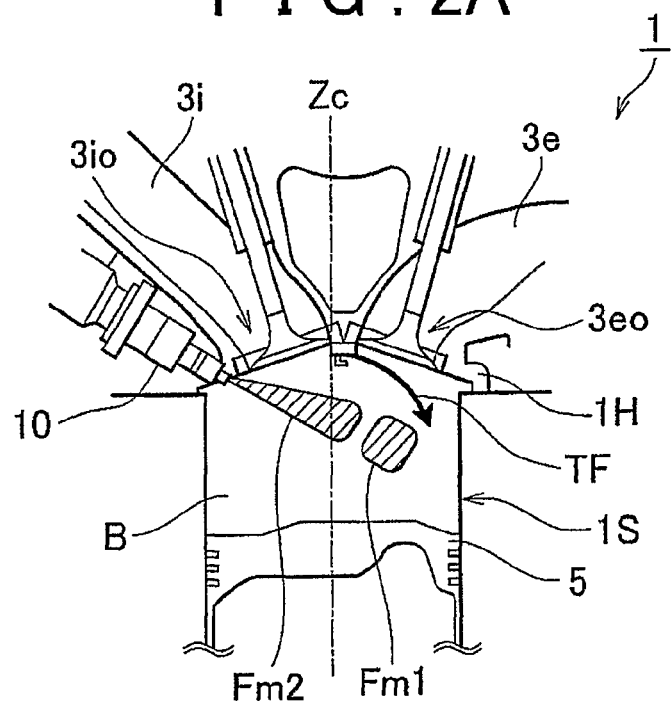
FIG. 2A is a schematic diagram showing a fuel spray and tumble flow that are formed within a combustion space of the internal combustion engine according to the embodiment.
Figure 2B:
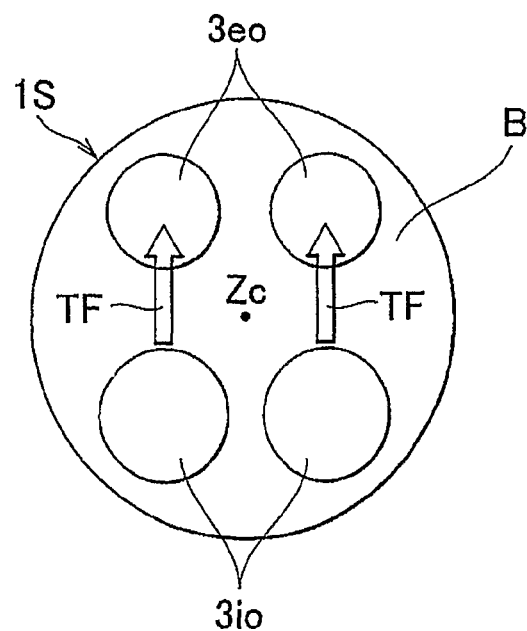
FIG. 2B is a plan view showing the tumble flow formed within the combustion space of the internal combustion engine according to the embodiment.

FIG. 2A is a schematic diagram showing a fuel spray and tumble flow that are formed within the combustion space of the internal combustion engine according to this embodiment. FIG. 2B is a plan view showing the tumble flow formed within the combustion space of the internal combustion engine according to this embodiment. As shown in FIG. 2A, the direct injection valve 10 can switch between an injection method (single injection method) for injecting the fuel into the combustion space B at once in an amount determined according to an operating condition of the internal combustion engine 1 (in a necessary fuel amount), and an injection method (multiple injection method) for injecting the necessary amount of fuel into the combustion space B of the cylinder 1S a plurality of times. FIG. 2A shows a case in which the necessary amount of fuel is injected, for example, twice, using the multiple injection method. In this case, a fuel spray Fm1 that is injected the first time and a fuel spray Fm2 that is injected the second time exist in the combustion space B.

A tumble flow TF is formed within the combustion space B of the internal combustion engine 1. The tumble flow TF is a flow of air that enters the combustion space B from the intake vent 3*io* of the intake port 3*i* and is directed from the intake vent 3*io* on the cylinder head 1H side toward the exhaust vent 3*eo* and then toward the piston 5, as shown in FIGS. 2A and 2B. This tumble flow is called "normal tumble flow" for convenience. The intensity and the like of the tumble flow TF can be adjusted by adjusting, for example, the inclination of the intake port 3*i* in relation to a central axis Zc of the cylinder 1S. In this embodiment the fuel if injected from the direct injection valve 10 along the tumble flow TF of the normal tumble flow. Therefore, the direct injection valve 10 is provided on the intake side (the side on which the intake vent 3*io* is provided). The direct injection valve 10 is also provided such that a fuel injection hole thereof faces the crankcase 1C side (see FIG. 1) on the exhaust side (the side on which the exhaust vent 3*eo* is provided).

Figure 4:
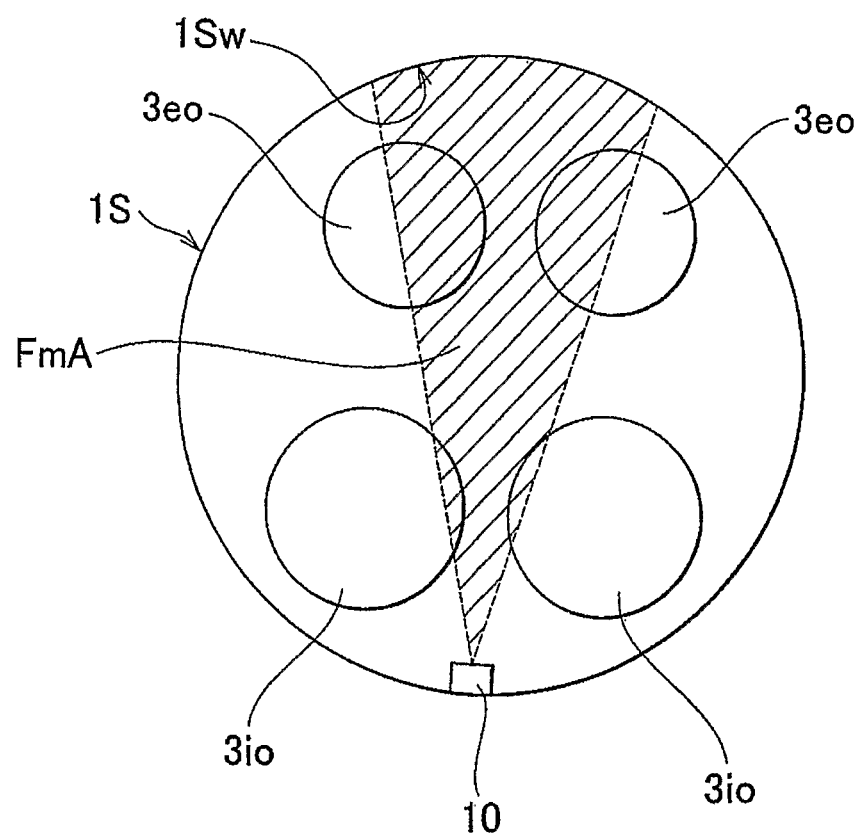
FIG. 4 is a plan view in which how the fuel is injected into the combustion space of the internal combustion engine according to the embodiment is viewed from a cylinder head side.
Figure 5A:
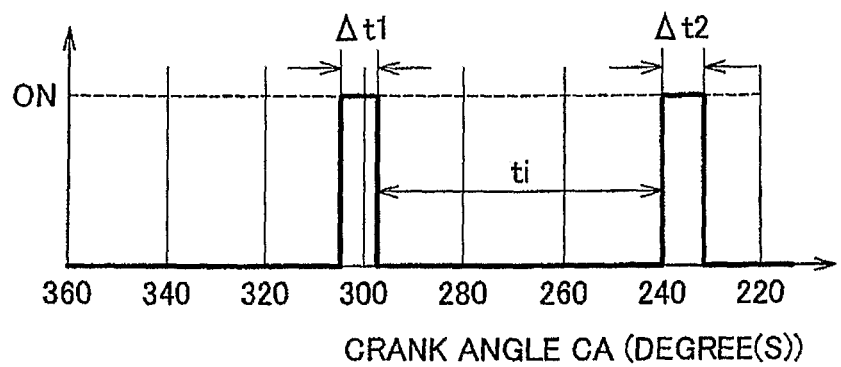
FIG. 5A is an explanatory diagram showing a timing at which the fuel is injected into the combustion space of the internal combustion engine according to the embodiment.
Figure 5B:
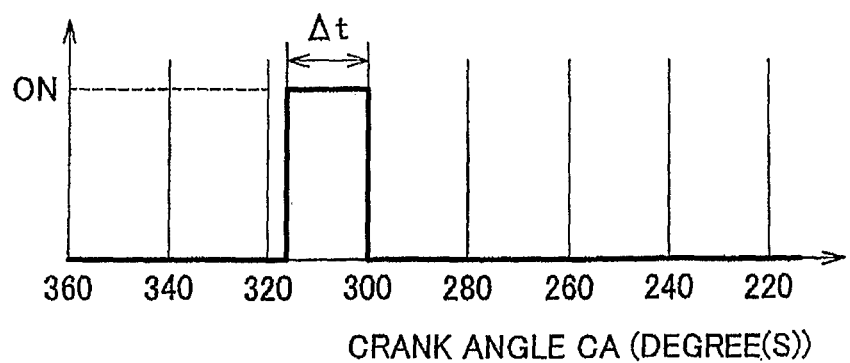
FIG. 5B is an explanatory diagram showing a timing at which the fuel is injected by means of a single injection method.

FIGS. 3A to 3F are explanatory diagrams showing how the fuel is injected into the combustion space of the internal combustion engine according to the embodiment. FIG. 4 is a plan view in which how the fuel is injected into the combustion space of the internal combustion engine according to this embodiment is viewed from the cylinder head side. FIG. 5A is an explanatory diagram showing a timing at which the fuel is injected into the combustion space of the internal combustion engine according to this embodiment. FIG. 5B is an explanatory diagram showing a timing at which the fuel is injected by means of the single injection method. Here, the horizontal axes shown in FIGS. 5A and 5B each represent the crank angle before a compression top dead center, in which the 360-degree point indicates an intake top dead center.

In the fuel injection control according to this embodiment, the direct injection valve 10 performs the early fuel injection (first fuel injection) for injecting the fuel toward an inner surface 1Sw of the cylinder 1S (cylinder inner surface) between a top surface 5T of the piston 5 (piston top surface) and the cylinder head 1H, at a point closer to the intake top dead center than a middle between the intake top dead center of the piston 5 and an intake bottom dead center of the piston 5. The direct injection valve 10 performs the late fuel injection (second fuel injection) for injecting the fuel into the combustion space B at a point closer to the intake bottom dead center than the point in the early fuel injection. More specifically, in the early fuel injection the fuel is injected from the direct injection valve 10 toward a section where the piston top surface 5T intersects with the cylinder inner surface 1Sw. Consequently, homogeneous mixing of the fuel and air can be accelerated. As a result, mixing of fuel and air is improved spatially and homogeneously, and the deterioration of combustion and an increase in fuel consumption and torque fluctuations in the internal combustion engine 1 can be prevented.

Next, the fuel injection control according to this embodiment is described in detail. Note in the following explanation that fuel injection is carried out once in the early fuel injection and the late fuel injection. The sum of the amount of fuel injected in the early fuel injection and the amount of fuel injected in the late fuel injection equals to the amount of fuel required per cycle of the internal combustion engine (total fuel injection amount). In this embodiment, the amount of fuel injected from the direct injection valve 10 during the early fuel injection is preferably greater than the amount of fuel injected from the direct injection valve 10 during the late fuel injection. It requires a certain amount of time to homogeneously mix air with the fuel injected into the combustion space B. Therefore, a greater amount of fuel can be mixed homogeneously with air by making the amount of fuel injected during the early fuel injection greater than the amount of fuel injected during the late fuel injection.

Figure 3A:
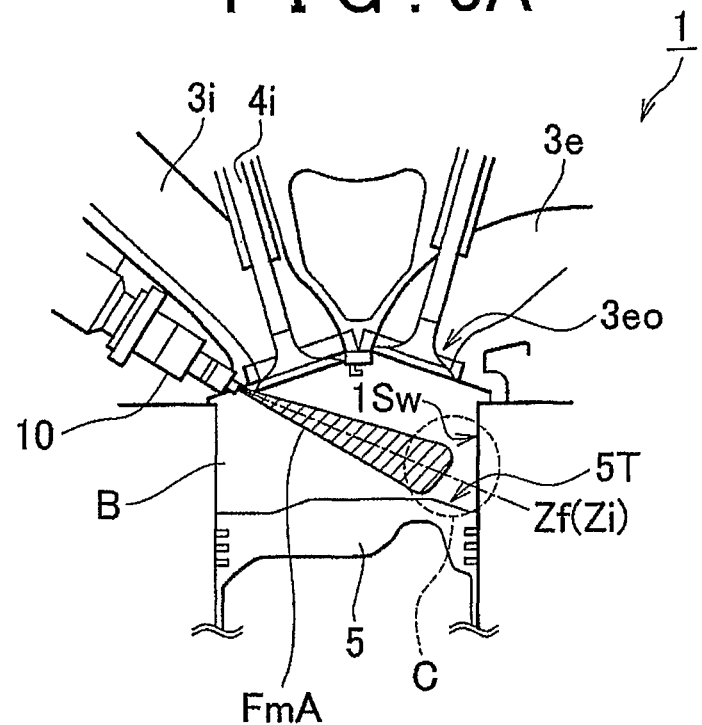
FIG. 3A is an explanatory diagram showing how fuel is injected into the combustion space of the internal combustion engine according to the embodiment.

FIG. 3A shows the early fuel injection. The early fuel injection (to be referred to as "early fuel injection" hereinafter) is performed during an intake stroke and closer to the intake top dead center than the middle between the intake top dead center of the piston 5 and the intake bottom dead center of the piston 5 (270 degrees before compression top dead center with respect to the compression top dead center). During the early fuel injection, the fuel is injected from the direct injection valve 10 so that a spray of fuel (fuel spray) FmA is directed to the section where the piston top surface 5T intersects with the cylinder inner surface 1Sw on the exhaust side (the exhaust vent 3*eo* side) (the section surrounded by a letter C in FIG. 3A). Therefore, the direction of the fuel spray FmA injected from the direct injection valve 10 is set at an angle at which an axis line Zf of the fuel spray FmA intersects with the cylinder inner surface 1Sw while the piston top surface 5T is positioned between the intake top dead center and the middle between the intake top dead center and intake bottom dead center. The axis line Zf of the fuel spray FmA matches an axis Zi of the fuel injection hole of the direct injection valve 10 (parallel to a direction in which the fuel injection hole is formed, and to a direction in which the fuel flows the fuel injection hole), and is parallel to a direction of travel of the fuel spray FmA. The fuel spray FmA injected from the direct injection valve 10 spreads out to a predetermined width and travels from the intake side (intake vent 3*io* side) to the section where the piston top surface 5T intersects with the cylinder inner surface 1Sw on the exhaust side (exhaust vent 3*eo* side).

In the early fuel injection, the fuel is injected at a timing at which the fuel spray FmA injected from the direct injection valve 10 reaches the section where the piston top surface 5T on the exhaust side intersects with the cylinder inner surface 1Sw. More preferably, the fuel is injected at a timing at which the fuel spray FmA injected from the direct injection valve 10 reaches the cylinder inner surface 1Sw before reaching the piston top surface 5T on the exhaust side, as will be described hereinafter. Therefore, the effect of allowing the tumble flow TF and the fuel spray FmA to reinforce each other without weakening the tumble flow TF can be achieved.

Figure 3B:
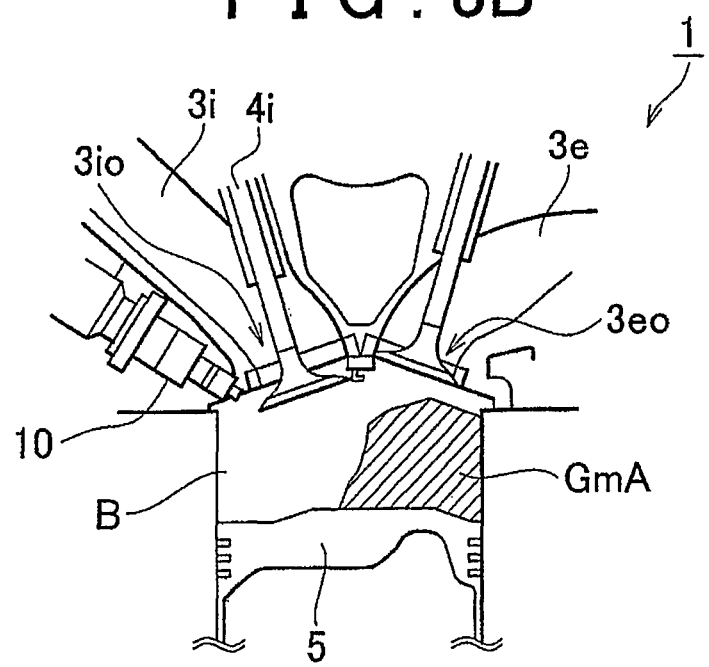
FIG. 3B is an explanatory diagram showing how the fuel is injected into the combustion space of the internal combustion engine according to the embodiment.

In the example shown in FIG. 5A, the late fuel injection is performed between approximately 305 degrees before compression top dead center and approximately 298 degrees before compression top dead center for a duration of Δt1. Injecting the fuel from the direct injection valve 10 at this timing brings the fuel eccentrically on the exhaust side. As a result, a mixture GmA of the fuel and air is eccentrically located on the exhaust side, as shown in FIG. 3B. The timing of the early fuel injection in a related art is generally called "worst injection timing (WIT)." In the single injection method the fuel and air are mixed extremely badly at the WIT and therefore the worst homogeneity is obtained in the air-fuel mixture. Therefore, the fuel is not injected at the WIT in the related art.

Figure 3C:
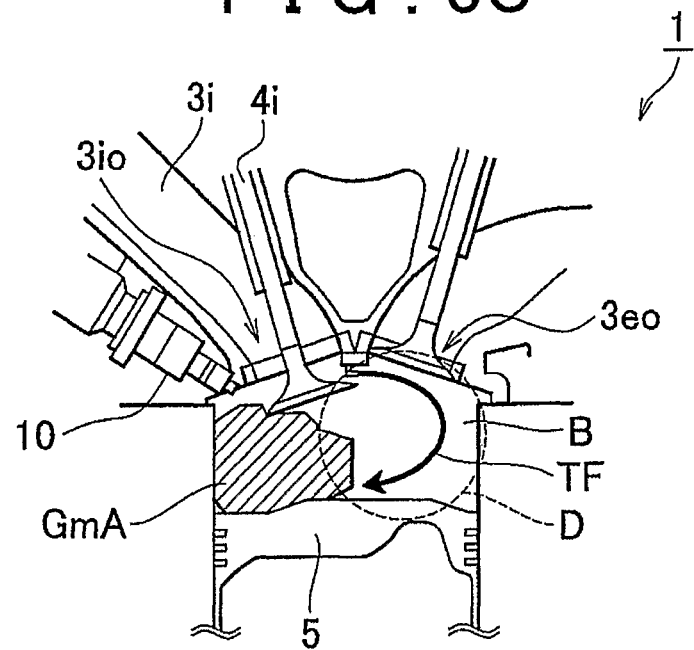
FIG. 3C is an explanatory diagram showing how the fuel is injected into the combustion space of the internal combustion engine according to the embodiment.

When the piston 5 moves toward the intake bottom dead center, the opening of the intake valve 4*i* increases, and therefore the amount of air flowing from the intake port, 3*i* into the combustion space B through the intake vent 3*io* increases. As shown in FIG. 3C, the air flowing from the intake vent 3*io* into the combustion space B forms the tumble flow TF. This tumble flow TF, a normal tumble flow, moves the air-fuel mixture GmA located eccentrically on the exhaust side toward the intake side. As a result, the air-fuel mixture GmA is eccentrically located on the intake side within the combustion space B, which makes the exhaust side (the section shown by a letter D in FIG. 3C) become an area with less or no fuel.

Figure 3D:
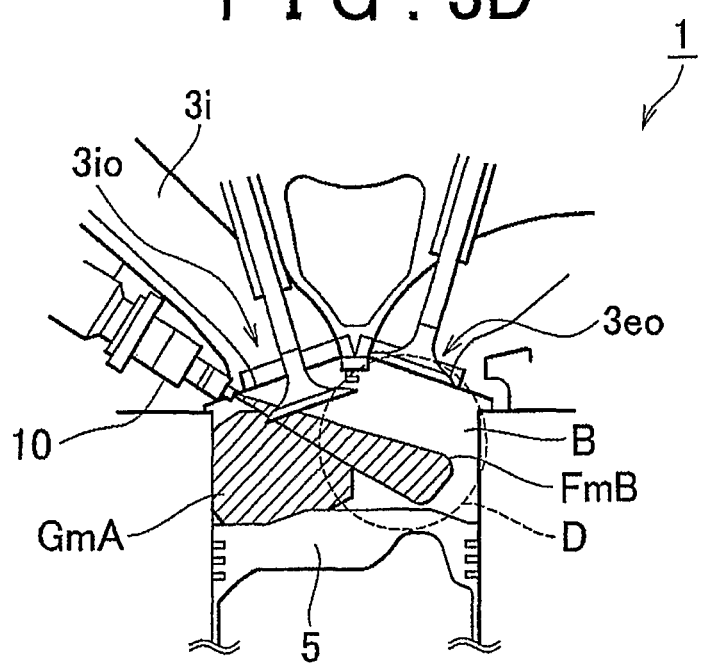
FIG. 3D is an explanatory diagram showing how the fuel is injected into the combustion space of the internal combustion engine according to the embodiment.
Figure 3E:
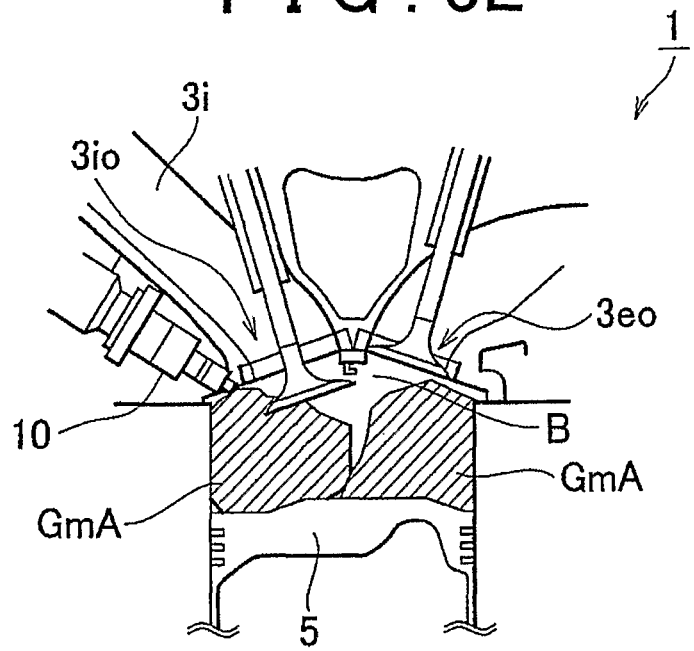
FIG. 3E is an explanatory diagram showing how the fuel is injected into the combustion space of the internal combustion engine according to the embodiment.

FIG. 3D shows the late fuel injection. The late fuel injection (to be referred to as "late fuel injection") is performed during the intake stroke and after the early fuel injection. During the late fuel injection, the fuel is injected from the direct injection valve 10 so that a fuel spray FmB is directed toward the cylinder inner surface 1Sw on the exhaust side. Specifically, the direct injection valve 10 injects the fuel toward the area on the exhaust side that has less or no fuel. In the example shown in FIG. 5A, the late fuel injection is performed between approximately 240 degrees before compression top dead center and approximately 232 degrees before compression top dead center for a duration of Δt2. The time interval from the end of the early fuel injection to the start of the late fuel injection is ti. Injecting the fuel from the direct injection valve 10 at this timing brings the fuel eccentrically on the exhaust side. As a result, a mixture GmB of the fuel and air is eccentrically located on the exhaust side, while the air-fuel mixture GmA injected during the early fuel injection is eccentrically located on the intake side, as shown in FIG. 3E.

Note that when the late fuel injection is started near the compression top dead center, there may not be enough time to mix the fuel and air, and the fuel and air may not be mixed sufficiently homogeneously. Therefore, it is preferred that the late fuel injection be executed before bottom dead center (180 degrees before compression top dead center) and that the air-fuel mixture GmA be moved accordingly to the intake side prior to the start of the late fuel injection. In addition, it is preferred that the tumble flow TF be designed such that the air-fuel mixture GmA makes such a movement.

Figure 3F:
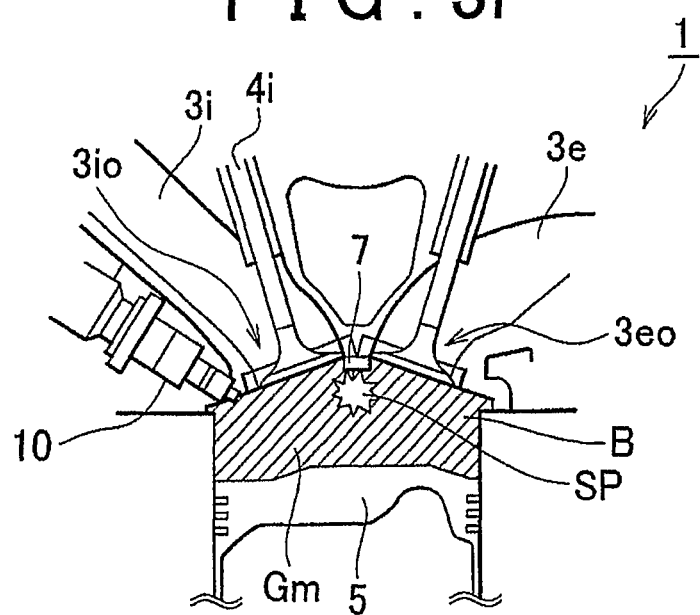
FIG. 3F is an explanatory diagram showing how the fuel is injected into the combustion space of the internal combustion engine according to the embodiment.

Once the late fuel injection is completed, the piston 5 passes through the intake bottom dead center and moves toward the compression, top dead center. In this process, the air-fuel mixture GmA that is formed within the combustion space B by the early fuel injection and moved from the exhaust side to the intake side, and the air-fuel mixture GmB that is formed on the exhaust side by the late fuel injection form a homogeneous mixture Gm over the entire inside of the combustion space B, as shown in FIG. 3F. A spark SP discharged from the spark plug 7 in this state ignites the homogeneous air-fuel mixture Gm formed within the combustion space B. In this embodiment, because homogeneous mixing of the fuel and air can be accelerated using the abovementioned methods, the deterioration of combustion and an increase in fuel consumption and torque fluctuations in the internal combustion engine 1 can be prevented. Moreover, because the fuel required per cycle of the internal combustion engine 1 can be injected separately in the early fuel injection and the late fuel injection, the penetrating force of the fuel spray injected from the direct injection valve 10 can be reduced. As a result, fuel dilution of oil (lubricating oil) that is caused by adhesion of the fuel spray to the cylinder inner surface 1Sw can be prevented.

Note that the timings of the early fuel injection and the late fuel injection vary depending on factors such as the intensity and direction of the tumble flow TF formed within the combustion space B, the size of the bore and stroke of the internal combustion engine 1, the direction of the fuel injected from the direct injection valve 10, the fuel pressure, and the operating condition of the internal combustion engine 1, but are not limited to the abovementioned timings. The timings of the early fuel injection and the late fuel injection are determined in view of, for example, the abovementioned factors, and a map is created and stored in the storage 31 of the engine ECU 30 shown in FIG. 1. Then, the control condition determination part 51 or injection controller 52 of the engine ECU 30 injects the fuel from the direct injection valve 10 on the basis of the map.

Figure 6:
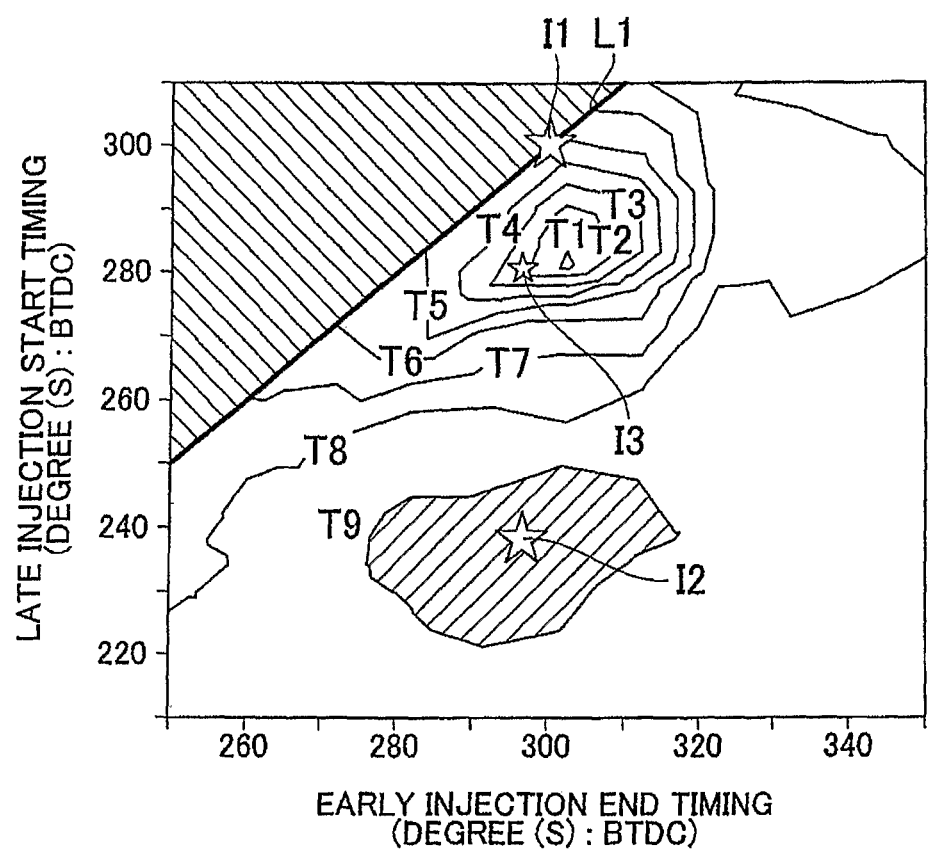
FIG. 6 is an explanatory diagram showing the relationship between the timing for injecting the fuel and torque fluctuations.

FIG. 6 is an explanatory diagram showing the relationship between the timing for injecting the fuel and torque fluctuations. FIG. 6 shows the results of torque fluctuations which are obtained when the fuel injection timings are changed under the conditions that the engine speed of the internal combustion engine 1 shown in FIG. 1 (the rotation speed of the crankshaft 6 per unit time) is 1200 revolution per minute (rpm) and the fuel pressure is 0.57 MPa. The horizontal axis of FIG. 6 represents an end timing of the early fuel injection (early injection end timing), and the vertical axis of FIG. 6 a start timing of the late fuel injection (late injection start timing). Both end and start timings are shown with crank angles before compression top dead center Before Top Dead Center (BTDC).

The solid line L1 shown in FIG. 6 indicates that the early injection end timing matches the late injection start timing. Specifically, the solid line L1 is a line that shows the relationship between the timing for injecting the fuel using the single injection method shown in FIG. 5B and a torque fluctuation. T1 to T9 shown in FIG. 6 indicate torque fluctuations (Nm) respectively. The smaller the degree of a torque fluctuation of the internal combustion engine 1 is, the higher the homogeneity of the air-fuel mixture existing in the combustion space B. In FIG. 6, the degrees of torque fluctuations are expressed such that T1>T2>T3>T4>T5>T6>T7>T8>T9. The solid lines represented by T1 to T9 indicate that the degrees of these torque fluctuations are the same.

I1 shown in FIG. 6 indicates a result obtained when the fuel is injected into the combustion space B by means of the single injection method at the timing shown in FIG. 5B, i.e., the timing at which the fuel injection is started at approximately 315 degrees before compression top dead center and ended at approximately 300 degrees before compression top dead center. The torque fluctuation is in the vicinity of T5. I2 shown in FIG. 6 indicates a result obtained when the fuel is injected into the combustion space B by means of the fuel injection control of this embodiment at the timing shown in FIG. 5A. As shown in FIG. 6, the torque fluctuation in this case falls within the area of the solid line T9, which means that the degree of this torque fluctuation is small. As indicated by I3 in FIG. 6, although the early injection end timing is the same as I2, the late injection start timing is closer to the intake top dead center than I2. In other words, I3 is shorter than I2 in terms of the time interval between the early injection end timing and the late injection start timing. The torque fluctuation in this case is T3 to T2. When supposing that the early injection end timing is the same as I2 and I3, the degree of a torque fluctuation decreases as the late injection start timing approaches compression top dead center and becomes the shortest at the timing of I2.

As described above, I2 is the result obtained by the fuel injection control according to this embodiment. Specifically, in the fuel injection control of this embodiment, the early fuel injection is performed at the timing of WIT, and the late fuel injection is performed when the fuel becomes lean on the exhaust side after the air-fuel mixture formed in the combustion space B by the early fuel injection is moved to the intake side by the tumble flow TF. As a result, homogeneous mixing of the fuel and air can be accelerated and mixing of the fuel and air can be improved spatially and homogeneously in the combustion space B, so that torque fluctuations in the internal combustion engine 1 can be prevented.

Figure 7:
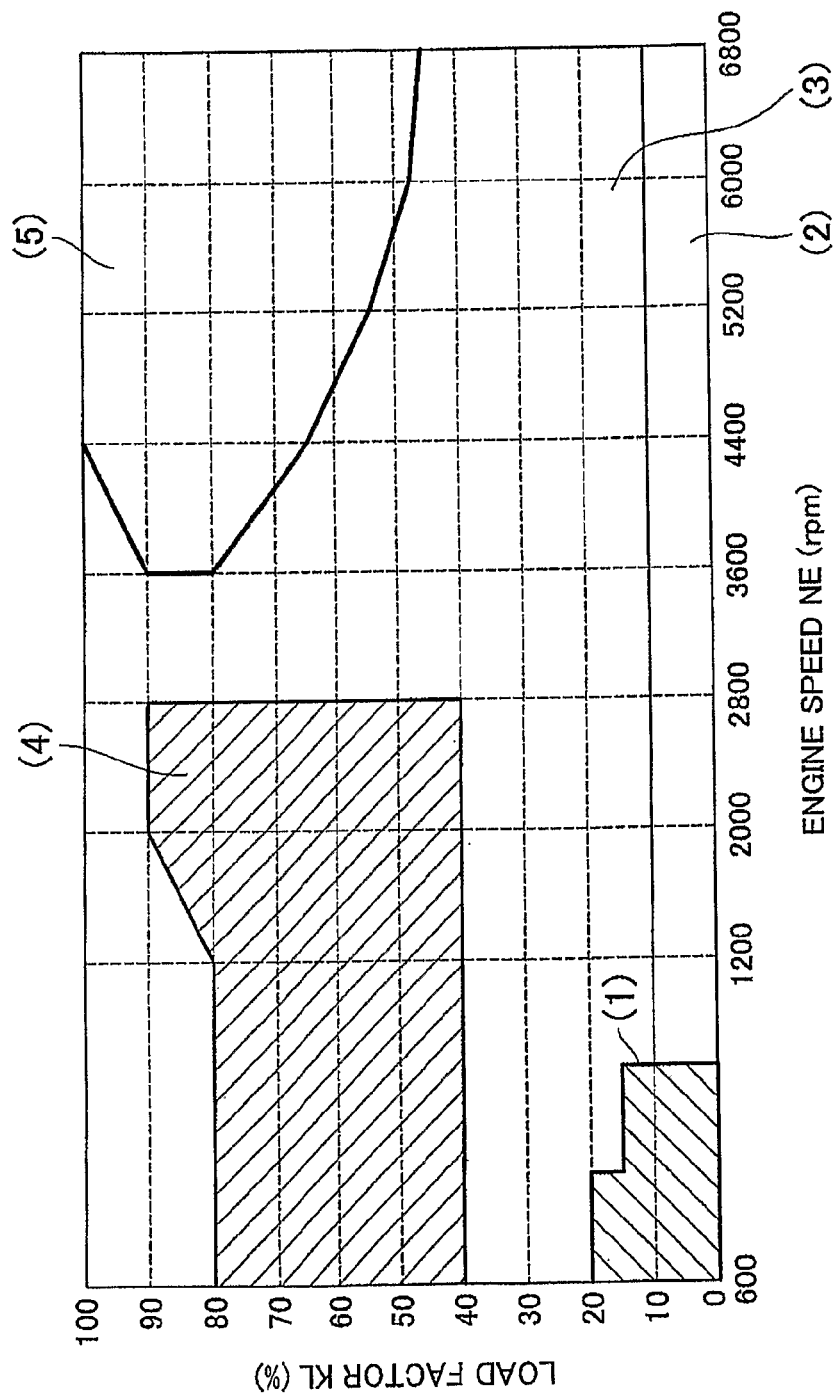
FIG. 7 is an explanatory diagram showing a condition for switching between the single injection method and a multiple injection for fuel injection control according to the embodiment.

FIG. 7 is an explanatory diagram showing a condition for switching between the single injection method and the multiple injection method for the fuel injection control according to this embodiment. The horizontal axis of FIG. 7 represents the engine speed NE of the internal combustion engine 1 shown in FIG. 1, and the vertical axis the load factor KL of the internal combustion engine 1 shown in FIG. 1. The load factor KL is the ratio of a load when the total load on the internal combustion engine 1 is 100%. In this embodiment the fuel is injected into the combustion space B in the early fuel injection and the late fuel injection, when, at least, the engine speed of the internal combustion engine 1 is a predetermined engine speed or lower, and when the load factor of the internal combustion engine 1 is at least a predetermined load factor.

The predetermined engine speed is an engine speed that is obtained when the torque fluctuations of the internal combustion engine 1 caused by a combustion fluctuation fall within the allowable range. In this embodiment, the engine speed that is obtained when the torque fluctuations of the internal combustion engine 1 fall within the allowable range is in medium speed (2800 rpm in this embodiment). The predetermined load factor, on the other hand, is a load factor at which the load on the internal combustion engine is at least middle load, and is, for example, at least 40% in this embodiment.

The amount of fuel injected from the direct injection valve 10 increases as the load of the internal combustion engine 1 increases. Therefore, in the case of the single injection method, the fuel and air cannot be mixed together easily. As a result, combustion may be degraded and the torque fluctuations of the internal combustion engine 1 may become larger. As in this embodiment, by injecting the fuel into the combustion space B by means of the early fuel injection and the late fuel injection at least when the internal combustion engine 1 is operated at medium load or more, the torque fluctuations of the internal combustion engine 1 can be prevented. Because the single injection method is employed when the engine speed of the internal combustion engine 1 is in low speed, the torque fluctuations of the internal combustion engine 1 caused by a combustion fluctuation become large. However, the torque fluctuations are reduced because the early fuel injection and the late fuel injection are carried out as the engine speed of the internal combustion engine 1 increases.

In this embodiment, the operating conditions of the internal combustion engine 1 in which the fuel is injected into the combustion space B by the early fuel injection and the late fuel injection are shown in the range (4) of FIG. 7. Specifically, the range (4) of FIG. 7 is the range where the engine speed of the internal combustion engine 1 is the predetermined engine speed or lower and the load factor of the internal combustion engine 1 is at least the predetermined load factor. When the internal combustion engine 1 is operated at least in this range, the fuel is injected into the combustion space B by the early fuel injection and the late fuel injection.

Therefore, homogenous mixing of fuel and air can be accelerated, and mixing of the fuel and air can be improved spatially and homogeneously, so that the deterioration of combustion and torque fluctuations of the internal combustion engine 1 caused by a combustion fluctuation can be prevented. Moreover, because the fuel is injected into the combustion space B using the single injection method in the torque fluctuation allowable areas (areas (1) to (3) and (5) in FIG. 7), an increase of the drive energy of the direct injection valve 10 that is caused by executing the early fuel injection and the late fuel injection can be prevented. The drive energy of the direct injection valve 10 uses the power generated by the internal combustion engine 1, thus fuel consumption of the internal combustion engine 1 can be restrained by switching between the single injection method in accordance with the operating conditions of the internal combustion engine 1 and a fuel injection method constituted by the early fuel injection and the late fuel injection.

Note that in the fuel injection method constituted by the early fuel injection and the late fuel injection, the amount of fuel injected in the early fuel injection and the late fuel injection needs to be at least the minimum amount of fuel injected from the direct injection valve 10. Therefore, even when the load on the internal combustion engine 1 is smaller than the medium load, the fuel may be injected into the combustion space B by the early fuel injection and the late fuel injection as long as the amount of fuel injected by the early fuel injection and the late fuel injection is at least the minimum amount of fuel injected from the direct injection valve 10.

The engine ECU 30 shown in FIG. 1 uses the control condition determination part 51 of the processor 50 to determine based on the operating conditions of the internal combustion engine 1 whether the fuel is injected using the single injection method or using the fuel injection method configured by the early fuel injection and late fuel injection. The fuel controller 52 of the processor 50 drives the direct injection valve 10 based on the result of the determination and injects the fuel into the combustion space B by means of the single injection method or the fuel injection method configured by the early fuel injection of late fuel injection.

Figure 8A:
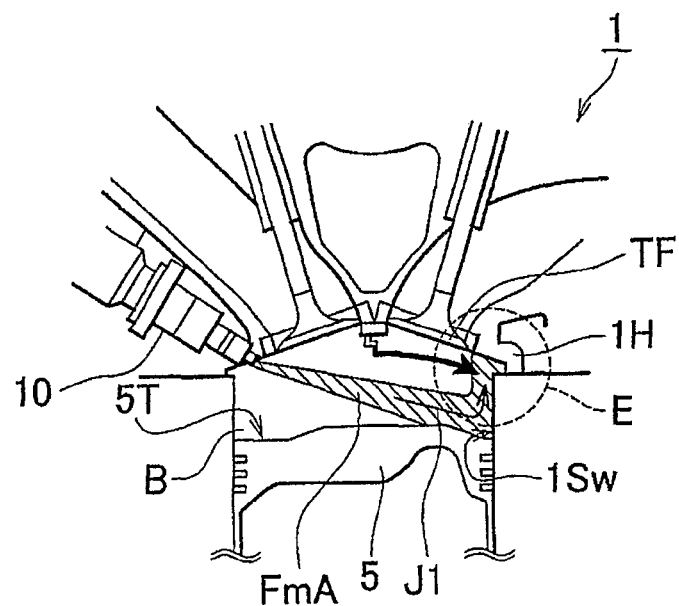
FIG. 8A is a schematic diagram of a comparative example of the fuel injection control according to the embodiment.
Figure 8B:
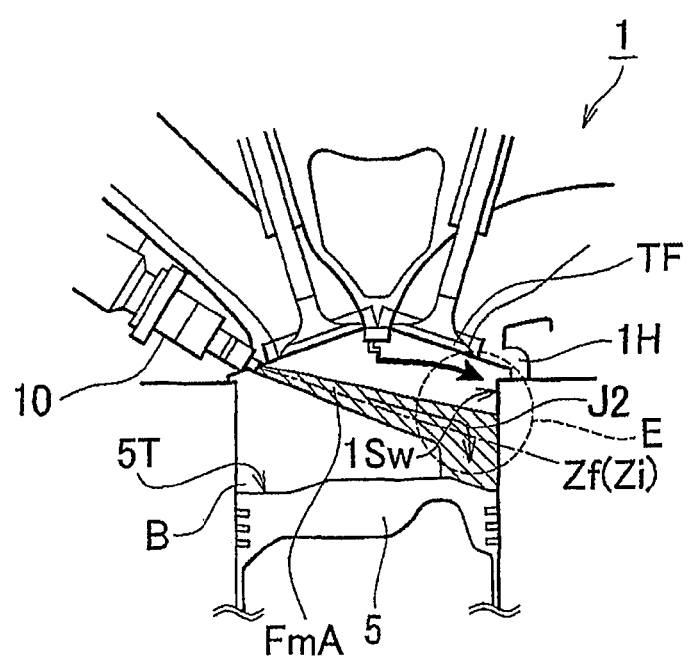
FIG. 8B is a schematic diagram for explaining a suitable timing of early fuel injection performed in the fuel injection control according to the embodiment.

FIG. 8A is a schematic diagram of a comparative example of the fuel injection control according to this embodiment. FIG. 8B is a schematic diagram for explaining a suitable timing of the early fuel injection performed in the fuel injection control according to this embodiment. The early fuel injection is performed during an intake stroke and closer to the intake top dead center than the middle between the intake top dead center of the piston 5 and the intake bottom dead center of the piston 5. At this moment, the early fuel injection is so performed that the tumble flow TF within the combustion space B is not blocked.

As shown in FIG. 8A, when the fuel spray FmA injected from the direct injection valve 10 reaches the piston top surface 5T before reaching the cylinder inner surface 1Sw, the fuel spray FmA rolls up toward the cylinder head 1H and thereby faces the tumble flow TF (the arrow J1 in the section shown by a letter E in FIG. 8A). Accordingly, the tumble flow TF within the combustion space B is attenuated. Then, the operation of the tumble flow TF for moving the mixture of the fuel and air formed by the early fuel injection and located eccentrically on the exhaust side to the intake side becomes weak, and, as a result, the fuel and air may not be mixed sufficiently homogeneously.

In this embodiment, in the early fuel injection, the fuel is injected from the direct injection valve 10 at a timing at which the fuel spray FmA injected from the direct injection valve 10 reaches the cylinder inner surface 1Sw before reaching the piston top surface 5T, as shown in FIG. 8B. In this manner, the fuel spray FmA is caused to follow the tumble flow TF. Because the fuel spray FmA travels in synchronization with the tumble flow TF (the arrow J2 in the section shown by a letter E in FIG. 8B), the fuel spray FmA and the tumble flow TF reinforce each other without weakening the tumble flow TF, which results in reinforcing the operation of moving the air-fuel mixture to the intake side, the air-fuel mixture being formed in the early fuel injection and located eccentrically on the exhaust side. As a result, the homogeneity of the air-fuel mixture improves. Therefore, the deterioration of combustion of the air-fuel mixture is prevented.

In order to inject the fuel from the direct injection valve 10 at a timing at which the fuel spray FmA reaches the cylinder inner surface 1Sw before reaching the piston top surface 5T, it is preferred to start injecting the fuel from the direct injection valve 10 at a timing at which the axis line Zf of the fuel spray FmA overlaps with the section where the piston top surface 5T intersects with the cylinder inner surface 1Sw. Specifically, it is preferred that the fuel be injected from the direct injection valve 10 at a timing at which the axis Zi of the fuel injection hole (the axis line Zf of the fuel spray FmA) provided in the direct injection valve 10 intersects with the piston top surface 5T and the cylinder inner surface 1Sw.

Figure 9A:
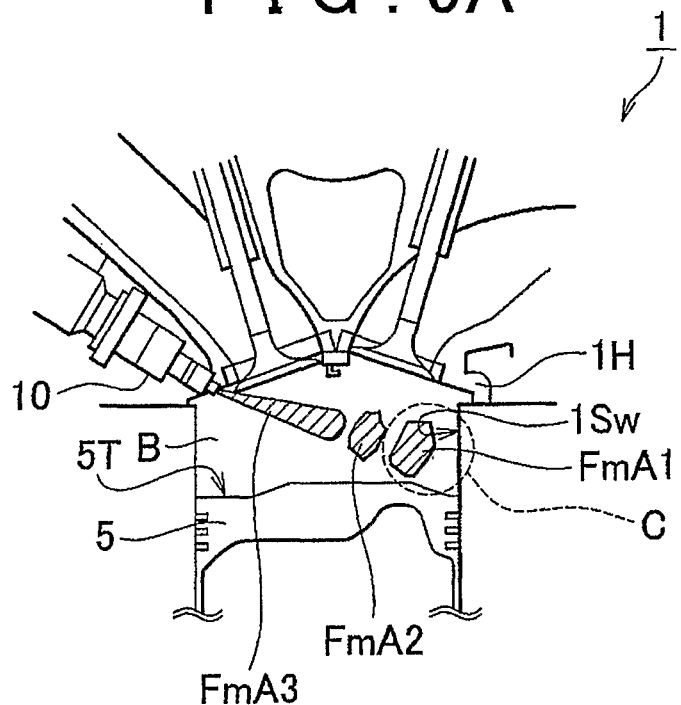
FIG. 9A is an explanatory diagram showing a method for injecting the fuel a plurality of times in the early fuel injection and late fuel injection in the fuel injection control according to the embodiment.
Figure 9B:
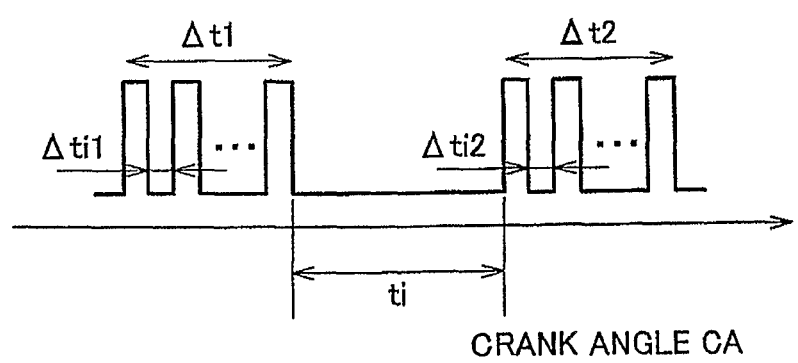
FIG. 9B is an explanatory diagram showing a method for injecting the fuel a plurality of times in the early fuel injection and late fuel injection in the fuel injection control according to the embodiment.

FIGS. 9A and 9B are explanatory diagrams, each a method for injecting the fuel a plurality of times in the early fuel injection and late fuel injection in the fuel injection control according to the embodiment. In this embodiment, because the fuel is injected from the direct injection valve 10 toward the cylinder inner surface 1Sw, the fuel tends to adhere to the cylinder inner surface 1Sw (the section surrounded by a letter C in FIG. 9A) and be mixed with the lubricating oil within the crankcase 1C (see FIG. 1), causing fuel dilution.

In order to prevent such fuel dilution, the fuel is injected an additional plurality of times in at least either the early fuel injection or the late fuel injection. FIG. 9A shows a state in which the fuel is injected a plurality of times in the early fuel injection, in which fuel sprays FmA1, FmA2 and FmA3 are injected into the combustion space B. As shown in FIG. 9B, in the early fuel injection the entire injection period $\Delta t1$ is divided into a plurality segments, and each time interval is $\Delta ti1$. In addition, in the late fuel injection the entire injection period $\Delta t2$ is divided into a plurality of segments, and each time interval is $\Delta ti2$. The time interval between the early fuel injection end timing and the late fuel injection start timing is represented by ti.

In this manner, the penetrating force of each fuel spray can be reduced by injecting the fuel an additional plurality of times in at least either the early fuel injection or the late fuel injection. As a result, the amount of fuel reaching and adhering to the cylinder inner surface 1Sw can be reduced and the fuel dilution can be prevented. In addition, because the early fuel injection and the late fuel injection are performed at the abovementioned timings, homogeneous mixing of the fuel and air can be accelerated and mixing of the fuel and air is improved spatially and homogeneously, so that fuel deterioration can be prevented. When injecting the fuel an additional plurality of times in at least either the early fuel injection or the late fuel injection, a fuel injection valve having a piezoelectric element (e.g., a piezo element) as an actuator or other valve with high responsiveness is preferably used as the direct injection valve 10. Therefore, the fuel can be securely injected a plurality of times in at least either the early fuel injection or the late fuel injection.

(Modification) FIGS. 10A to 10F are explanatory diagram, each showing how fuel is injected into a combustion space of an internal combustion engine according to a modification of this embodiment. FIG. 11 is a schematic diagram in which the internal combustion engine according to the modification of this embodiment is viewed from the cylinder head side. An internal combustion engine 1a according to this embodiment has substantially the same configuration as the internal combustion engine 1 (see FIG. 1) described above, except that a direct injection valve 10a is provided in a central section of the cylinder head 1H. The rest of the configuration of the internal combustion engine 1a and fuel injection control thereof are same as those described in the above embodiment.

Figure 10A:
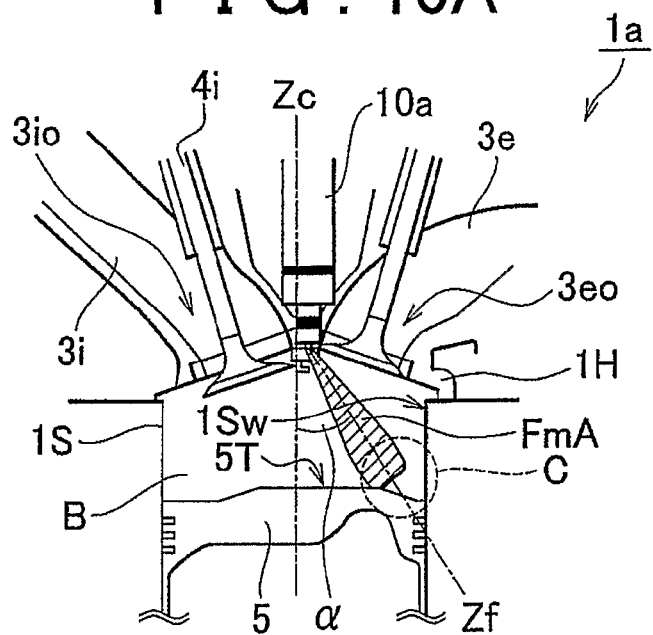
FIG. 10A is an explanatory diagram showing how fuel is injected into a combustion space of an internal combustion engine according to a modification of the embodiment.
Figure 11:
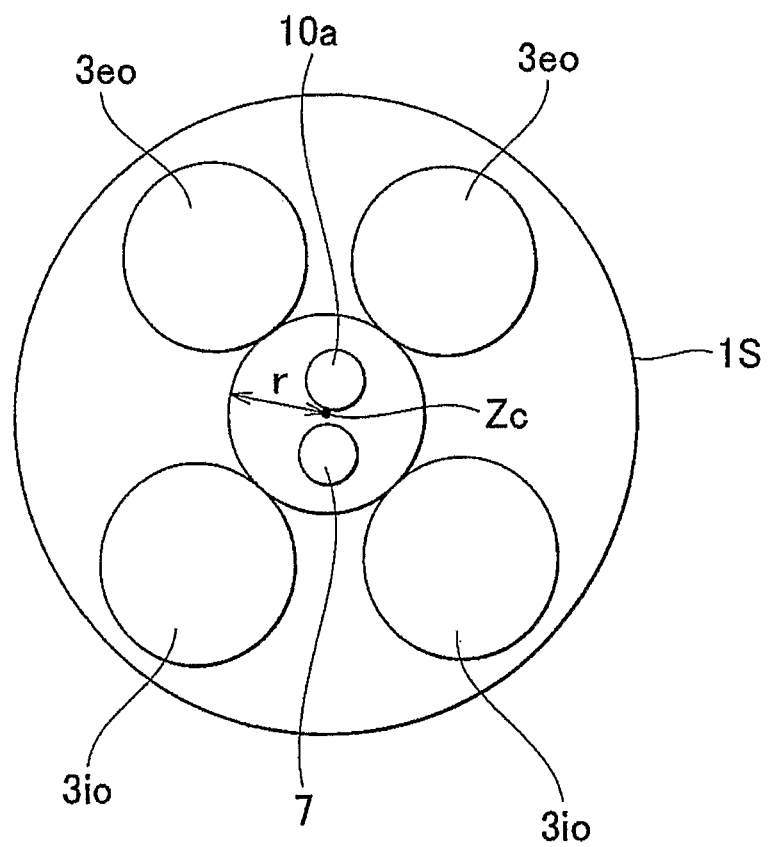
FIG. 11 is a schematic diagram in which the internal combustion engine according to the modification of the embodiment is viewed from the cylinder head side.

As shown in FIGS. 10A and 11, in the internal combustion engine 1a the direct injection valve 10a and spark plug 7 are provided in the central section of the cylinder head 1H. The central section of the cylinder head 1H is a section surrounded by the intake vents 3io, 3io, and the exhaust vents 3eo, 3eo, as shown in FIG. 11. More specifically, the central section of the cylinder head. 1H is the inside of a circle formed around the central axis Zc of the cylinder 1S and having a radius r. More specifically, the radius r is either the distance between the central axis Zc of the cylinder and an outer periphery of the intake vent 3io, or the distance between the central axis Zc of the cylinder and an outer periphery of the exhaust vent 3eo, whichever is greater.

As shown in FIG. 10A, the direct injection valve 10a is configured such that the fuel spray FmA is directed toward the cylinder inner surface 1Sw on the exhaust side (the exhaust vent 3eo side). Specifically, the fuel spray FmA injected from the direct injection valve 10a is inclined toward the exhaust side by a predetermined angle $\alpha$ with respect to the central axis Zc of the cylinder 1S. The predetermined angle $\alpha$ is set at an angle at which the axis line Zf of the fuel spray FmA intersects with the cylinder inner surface 1Sw in a state in which the piston top surface 5T is positioned between the intake top dead center and the middle between the intake top dead center and intake bottom dead center. Therefore, the fuel is injected from the direct injection valve 10a into the combustion space B at a point closer to the intake top dead center than the middle between the intake top dead center of the piston 5 and the intake bottom dead center of the piston 5, and then the fuel spray FmA is directed to the section where the piston top surface 5T intersects with the cylinder inner surface 1Sw (the section surrounded by a letter C in FIG. 10A).

The early fuel injection shown in FIG. 10A is performed during an intake stroke and closer to the intake top dead center than the middle between the intake top dead center of the piston 5 and the intake bottom dead center of the piston 5. In the early fuel injection, the fuel is injected from the direct injection valve 10 such that the fuel spray FmA is directed toward the section where the piston top surface 5T on the exhaust side intersects with the cylinder inner surface 1Sw.

Figure 10B:
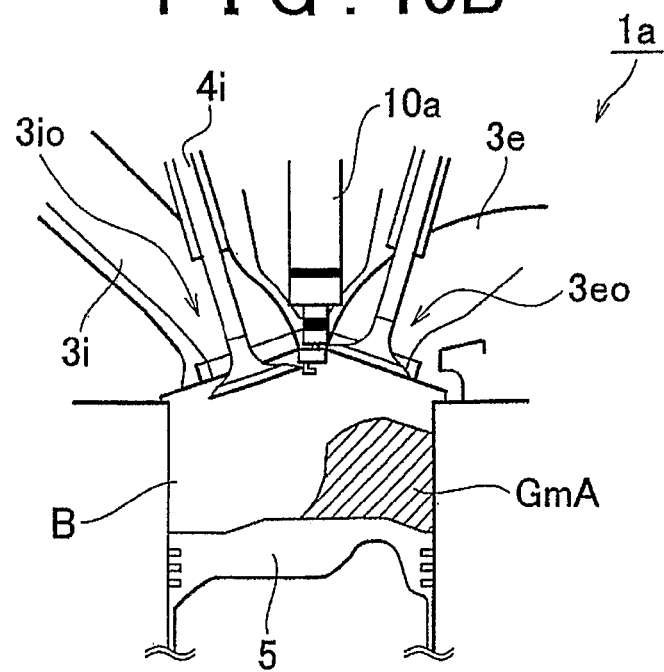
FIG. 10B is an explanatory diagram showing how fuel is injected into the combustion space of the internal combustion engine according to the modification of the embodiment.

The fuel is located eccentrically on the exhaust side by performing this early fuel injection. As a result, the air-fuel mixture GmA is located eccentrically on the exhaust side, as shown in FIG. 10B. The timing of the early fuel injection is called "WIT," as described above. In the single injection method the fuel and air are mixed extremely badly at this timing and therefore the worst homogeneity is obtained in the air-fuel mixture. Therefore, the fuel is not injected at the WIT in the related art.

Figure 10C:
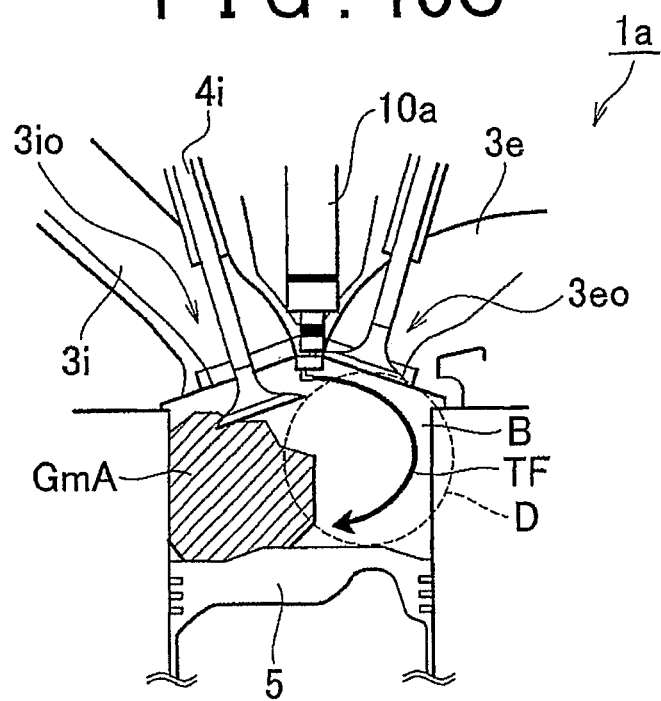
FIG. 10C is an explanatory diagram showing how fuel is injected into the combustion space of the internal combustion engine according to the modification of the embodiment.

When the piston 5 moves toward the intake bottom dead center, the opening of the intake valve 4i increases, and therefore the amount of air flowing from the intake port 3i into the combustion space B through the intake vent 3io increases. As shown in FIG. 10C, the air flowing from the intake vent 3io into the combustion space B forms the tumble flow TF. This tumble flow TF, a normal tumble flow, moves the air-fuel mixture GmA located eccentrically on the exhaust side toward the intake side. As a result, the air-fuel mixture GmA is eccentrically located on the intake side within the combustion space B, which makes the exhaust side (the section shown by a letter D in FIG. 10C) become an area with less or no fuel.

Figure 10D:
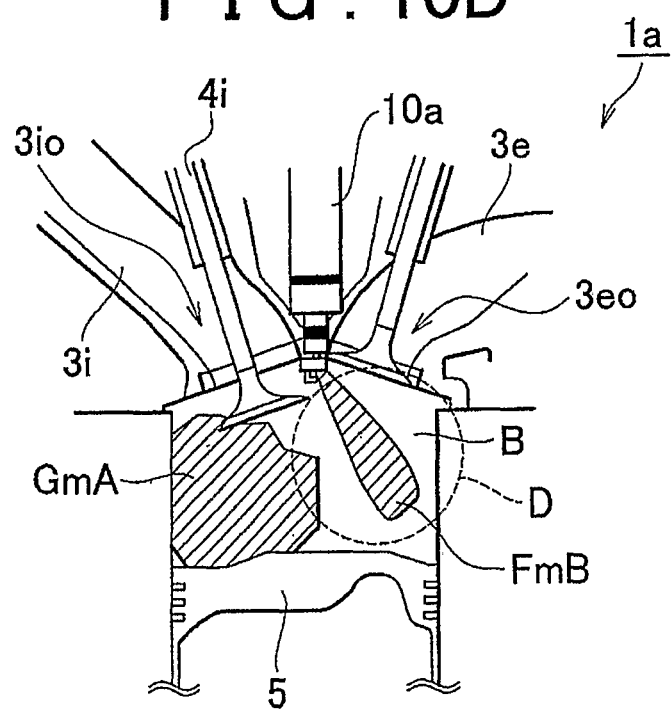
FIG. 10D is an explanatory diagram showing how fuel is injected into the combustion space of the internal combustion engine according to the modification of the embodiment.
Figure 10E:
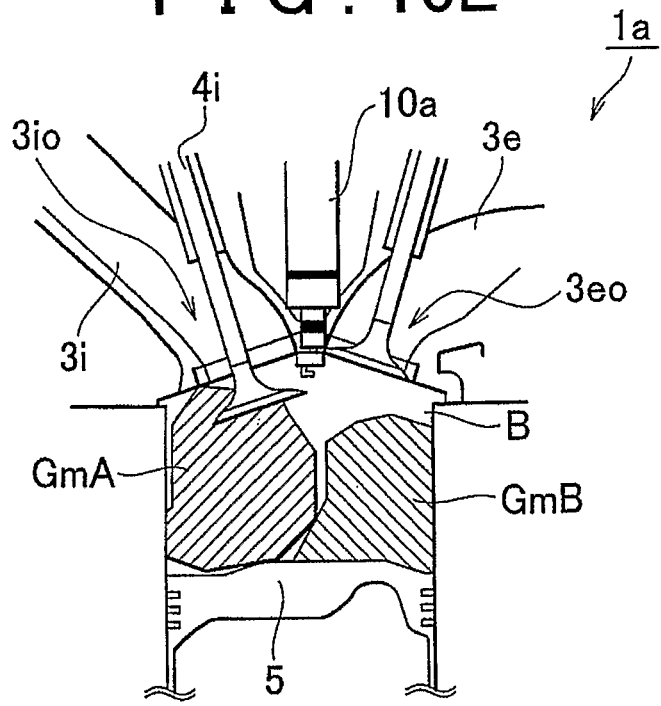
FIG. 10E is an explanatory diagram showing how fuel is injected into the combustion space of the internal combustion engine according to the modification of the embodiment.

The late fuel injection shown in FIG. 10D is performed during the intake stroke of the internal combustion engine 1a and after the early fuel injection. In the late fuel injection the direct injection valve 10a injects the fuel toward the area on the exhaust side that has less or no fuel. The fuel is located eccentrically on the exhaust by performing this late fuel injection. As a result, the mixture GmB of the fuel and air is eccentrically located on the exhaust side of the combustion space B, while the air-fuel mixture GmA injected during the early fuel injection is eccentrically located on the intake side, as shown in FIG. 10E.

Figure 10F:
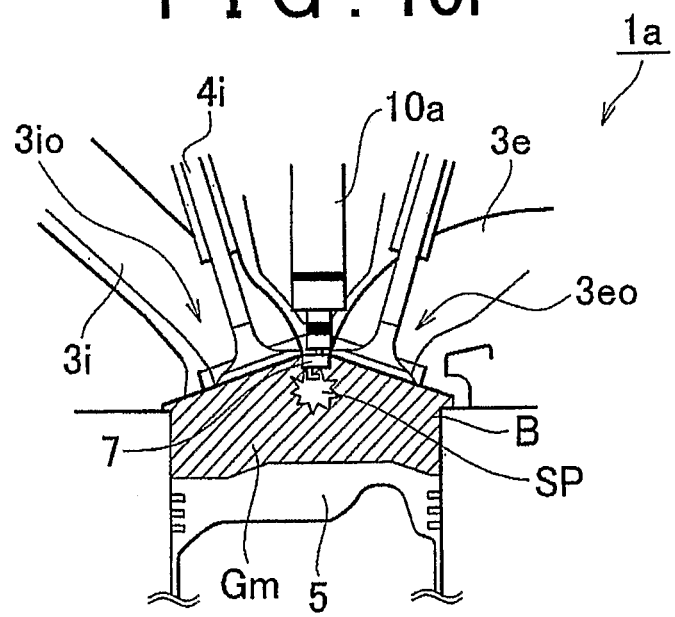
FIG. 10F is an explanatory diagram showing how fuel is injected into the combustion space of the internal combustion engine according to the modification of the embodiment.

Once the late fuel injection is completed, the piston 5 passes through the intake bottom dead center and moves toward the compression top dead center. In this process, the air-fuel mixture GmA that is formed within the combustion space B by the early fuel injection and moved from the exhaust side to the intake side, and the air-fuel mixture GmB that is formed on the exhaust side by the late fuel injection form a homogeneous mixture Gm over the entire inside of the combustion space B, as shown in FIG. 10F. A spark SP discharged from the spark plug 7 in this state ignites the homogeneous air-fuel mixture Gm formed within the combustion space B. As described above, because homogeneous mixing of the fuel and air can be accelerated by the early fuel injection and the late fuel injection, the deterioration of combustion and an increase in fuel consumption and torque fluctuations in the internal combustion engine 1 can be prevented.

As described above, in the embodiment and the modification thereof, the early fuel injection is performed to inject the fuel toward the section where the piston top surface intersects with the cylinder inner surface, at a point closer to the intake top dead center than the middle between the intake top dead center of the piston and the intake bottom dead center of the piston. Then, the late fuel injection is performed to inject the fuel into the combustion space, at a point closer to the intake bottom dead center than the point in the early fuel injection, after the air-fuel mixture formed on the exhaust side by the early fuel injection is moved to the intake side by the tumble flow. As a result, homogeneous mixing of the fuel and air can be accelerated, and mixing of fuel and air is improved spatially and homogeneously, whereby a homogeneous air-fuel mixture can be formed in the entire combustion space. Therefore, and the deterioration of combustion can be prevented.

In the embodiment and the modification thereof, due to the configuration described above, the homogeneous air-fuel mixture can be formed using the direct injection valve only, without using a port injection valve for injecting fuel and the intake port together at the same time. Therefore, the production cost of the internal combustion engine can be reduced. In addition, although a method for using a tumble control valve, swirl control valve, or other air current control means to increase the speed of the air flowing into the combustion chamber in order to accelerate the mixing of the fuel and air, but the problem of this method is that the entire load performance is reduced a cost increase or a decrease in air flow. In this embodiment, however, due to the configuration described above, the homogeneous air-fuel mixture can be formed using the direct injection valve only, without using the air current control means.

Although the embodiment and the modification thereof described an aspect in which the fuel is injected toward the exhaust side of the internal combustion engine having a normal tumble flow formed in the combustion space, the embodiment and the modification thereof can be similarly applied, as with the case of the normal tumble flow, to an aspect in which the fuel is injected toward the intake side of an internal combustion engine having a reverse tumble flow formed in a combustion space of the internal combustion engine.

As described above, the internal combustion engine according to this invention is useful in an internal combustion engine having a fuel injection device for injecting fuel directly into a combustion space, and is particularly suitable for accelerating homogeneous mixing of fuel and air by using the fuel injection device only.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example, combinations and configurations, other combinations and configurations, including more, less or only a single element, are also within the scope of the appended claims.

The invention claimed is:

1. An internal combustion engine, in which a tumble flow that is directed from an intake vent opened on a cylinder head provided at one end of a cylinder having a piston reciprocating therein, to an exhaust vent opened on the cylinder head is formed on the cylinder head side, the internal combustion engine comprising:
   a combustion space surrounded by the cylinder, the cylinder head, and the piston reciprocating within the cylinder; and
   a fuel injection device that performs early fuel injection for injecting fuel toward an inner surface of the cylinder between a top surface of the piston and the cylinder head, at a point closer to an intake top dead center than a middle between the intake top dead center and an intake bottom dead center, and late fuel injection for injecting the fuel into the combustion space at a point closer to the intake bottom dead center than the point in the early fuel injection.

2. The internal combustion engine according to claim 1, wherein, during the early fuel injection, the fuel injection device injects the fuel toward a section where the top surface of the piston intersects with the inner surface of the cylinder.

3. The internal combustion engine according to claim 1, wherein the fuel injection device performs the late fuel injection after an air-fuel mixture formed in the combustion space by the early fuel injection is moved to the intake vent side by a tumble flow that is generated by a fluid introduced from the intake vent into the combustion space.

4. The internal combustion engine according to claim 1, wherein the fuel injection device injects the fuel during the early fuel injection such as to allow a spray of fuel injected by the fuel injection device to follow the tumble flow of the fluid flowing from the intake vent into the combustion space.

5. The internal combustion engine according to claim 1, wherein the fuel injection device injects the fuel such that a spray of fuel injected by the fuel injection device reaches the inner surface of the cylinder first before reaching the top surface of the piston.

6. The internal combustion engine according to claim 1, wherein the fuel injection device injects the fuel when an axis line of a spray of fuel injected by the fuel injection device overlaps with a section where the top surface of the piston intersects with the inner surface of the cylinder.

7. The internal combustion engine according to claim 1, wherein the fuel injection device injects the fuel into the combustion space by means of the early fuel injection and the late fuel injection, when an engine speed of the internal combustion engine is a predetermined engine speed or lower and a load factor of the internal combustion engine is at least a predetermined load factor.

8. The internal combustion engine according to claim 7, wherein the fuel injection device injects the fuel into the combustion space by means of the early fuel injection and the late fuel injection, when the predetermined engine speed is equal to or lower than an engine speed at which a torque fluctuation of the internal combustion engine falls within an allowable range.

9. The internal combustion engine according to claim 1, wherein the fuel injection device injects the fuel into the combustion space by means of the early fuel injection and the late fuel injection, when the amount of fuel injected into the internal combustion engine is at least a minimum amount of fuel injected by the fuel injection device.

10. The internal combustion engine according to claim 1, wherein the fuel injection device injects the fuel a plurality of times during at least either the early fuel injection or the late fuel injection.

11. The internal combustion engine according to claim 1, wherein the fuel injection device injects the fuel in a greater amount in the early fuel injection than the amount of fuel injected in the late fuel injection.

12. The internal combustion engine according to claim 1, wherein the fuel injection device is provided on the intake vent side.

13. The internal combustion engine according to claim 1, wherein the fuel injection device is provided in a central section of the cylinder head.

14. A fuel injection control method for an internal combustion engine in which a tumble flow that is directed from an intake vent opened on a cylinder head provided at one end of a cylinder having a piston reciprocating therein, to an exhaust vent opened on the cylinder head is formed on the cylinder head side, the fuel injection control method comprising the steps of:

performing early fuel injection for injecting fuel toward an inner surface of the cylinder between a top surface of the piston and the cylinder head, at a point closer to an intake top dead center than a middle between the intake top dead center and an intake bottom dead center; and performing late fuel injection for injecting the fuel into a combustion space surrounded by the cylinder, the cylinder head, and the piston reciprocating within the cylinder, at a point closer to the intake bottom dead center than the point in the early fuel injection.

\* \* \* \* \*